US009834309B2

(12) United States Patent
Schneider et al.

(10) Patent No.: US 9,834,309 B2
(45) Date of Patent: Dec. 5, 2017

(54) AIR TRANSMISSION SYSTEM FOR FLEXIBLE PASSENGER SUPPLY UNITS

(71) Applicant: Airbus Operations GmbH, Hamburg (DE)

(72) Inventors: Uwe Schneider, Hamburg (DE); Vladimir Berger, Hamburg (DE); Andreas Wietzke, Hamburg (DE)

(73) Assignee: Airbus Operations GmbH (DE)

( * ) Notice: Subject to any disclaimer, the term of this patent is extended or adjusted under 35 U.S.C. 154(b) by 372 days.

(21) Appl. No.: 14/548,426

(22) Filed: Nov. 20, 2014

(65) Prior Publication Data

US 2015/0140914 A1 May 21, 2015

(30) Foreign Application Priority Data

Nov. 21, 2013 (EP) ..................................... 13193857

(51) Int. Cl.
*B64D 13/00* (2006.01)
*B64D 11/00* (2006.01)

(52) U.S. Cl.
CPC .............. *B64D 13/00* (2013.01); *B64D 11/00* (2013.01); *B64D 2013/003* (2013.01)

(58) Field of Classification Search
CPC .. B64D 13/00; B64D 11/00; B64D 2013/003; F16K 31/084; F16K 31/086
USPC ...... 454/76, 71; 251/65, 231, 236, 242, 243, 251/245, 246
See application file for complete search history.

(56) References Cited

U.S. PATENT DOCUMENTS

| 3,700,000 A | * | 10/1972 | Hesse | ................... A61M 16/20 128/204.19 |
|---|---|---|---|---|
| 5,947,547 A | * | 9/1999 | Deeks | ..................... B60R 13/02 296/146.6 |
| 8,454,415 B2 | | 6/2013 | Nitsche et al. | |
| 8,844,865 B2 | | 9/2014 | Gehm et al. | |
| 9,227,730 B2 | | 1/2016 | Markwart et al. | |
| 2010/0087130 A1 | | 4/2010 | Nitsche et al. | |

(Continued)

FOREIGN PATENT DOCUMENTS

| CN | 101827751 A | 9/2010 |
|---|---|---|
| CN | 201837022 U | 5/2011 |

(Continued)

OTHER PUBLICATIONS

EP Search Report (13 193 857.3) dated Jun. 18, 2014.
Chinese Office Action dated Mar. 2, 2016.

*Primary Examiner* — Gregory Huson
*Assistant Examiner* — Elizabeth M May
(74) *Attorney, Agent, or Firm* — Lerner, David, Littenberg, Krumholz & Mentlik, LLP

(57) ABSTRACT

An air supply system for passengers includes an air supply line with a plurality of laterally situated air outlets, an individual air panel with at least one air nozzle and an air inlet opening. The individual air panel can be variably positioned along the air supply line in such a way that the air inlet opening faces one of the air outlets. A plurality of magnetic valves is arranged at the air outlets of the air supply line. One of the magnetic valves may be magnetically actuated by the individual air panel, when the air inlet opening of the individual air panel faces said one magnetic valve, so that air can flow out of the air supply line through the air outlet and the air inlet opening to the air nozzle.

11 Claims, 4 Drawing Sheets

(56) References Cited

U.S. PATENT DOCUMENTS

| | | | | |
|---|---|---|---|---|
| 2010/0102257 | A1* | 4/2010 | Achor | F02M 25/0836 251/65 |
| 2010/0199982 | A1* | 8/2010 | Hansen | A61M 15/009 128/200.21 |
| 2012/0032027 | A1* | 2/2012 | Gehm | B64D 11/00 244/118.5 |
| 2012/0129438 | A1* | 5/2012 | Grosse-Plankermann | B64D 13/00 454/76 |

FOREIGN PATENT DOCUMENTS

| | | | | |
|---|---|---|---|---|
| CN | 102405174 A | 4/2012 | | |
| DE | 102007014406 B3 | 4/2008 | | |
| DE | 10 2009 018111 A1 | 10/2010 | | |
| DE | 10 2010 012882 B3 | 7/2011 | | |
| DE | 102010008626 A1 * | 8/2011 | | B64D 13/00 |

* cited by examiner

AIR TRANSMISSION SYSTEM FOR FLEXIBLE PASSENGER SUPPLY UNITS

FIELD OF THE INVENTION

The invention relates to an air supply system for passengers in a passenger compartment, for example of an aircraft. In particular, the invention relates to a system for transmitting air in passenger supply units (passenger supply unit/PSU), which can be flexibly arranged relative to a central air supply line.

BACKGROUND OF THE INVENTION

DE 10 2010 012 882 B3 shows a system for supplying individual air with an air line and a sliding individual air panel. The air line has a tubular element with a slotted opening formed in the longitudinal direction, and a lamellar element, which is suitable for closing the slotted opening. The individual air panel has a housing, an air nozzle for controlling individual air on the front side of the housing, and a cantilever arm on the rear side of the housing for displacing the lamellar element, and thereby partially opening the air line, as well as an opening for receiving air from the air line.

Described in DE 10 2007 014 406 B3 is a supply channel with an air distribution system that comprises an oblong housing, a hollow profile extending in the longitudinal direction of the housing, and at least one air shower with an air inlet and at least one air outlet. A plurality of perforation openings is incorporated in a jacket surface of the hollow profile. The air shower is designed in such a way as to abut tightly against the jacket surface of the hollow profile in one area of the air inlet. Perforation openings emptying into an air inlet of an air shower can be sealed by means of an adhesive film applied thereto. The supply channel makes it possible to variably position air showers along the longitudinal direction of the supply channel.

However, the problem in such air distribution systems is that the air showers or air nozzles must be adjusted to the respective seat positions, which significantly hampers installation in the cabin equipment and retrofitting. This greatly limits the flexibility of the cabin configuration, since the aircraft reference documentation and connecting points must be determined very early on in the definition process.

BRIEF SUMMARY OF THE INVENTION

An aspect of the invention may provide an air supply system that can be easily adjusted to a modified seat layout.

In general, an air supply system for passengers according to an embodiment, comprises an air supply line with a plurality of laterally situated air outlets, an individual air panel with at least one air nozzle and an air inlet opening, wherein the individual air panel can be variably positioned along the air supply line in such a way that the air inlet opening faces one of the air outlets, and a plurality of magnetic valves arranged at the air outlets of the air supply line. One of the magnetic valves may be magnetically actuated by the individual air panel, when the air inlet opening of the individual air panel faces said one magnetic valve, so that air can flow out of the air supply line through the air outlet and the air inlet opening to the air nozzle.

If the position of the individual air panel is changed in the longitudinal direction of the supply line, air flows out of the air outlet only at the location of the air inlet opening.

The air supply system enables a distribution of individual air panels without having to specially adjust the individual air supply. A flexible interface between the individual air panels and aircraft air supply system or climate control system permits an individual air supply at any longitudinal coordinate of the aircraft cabin. An operator thus has the option of selecting any seat spacing configuration desired, without having to reposition the supply channel. Instead, he or she can simply shift the individual air panels or give them a staggered arrangement.

Each of the air outlets incorporate a magnetic valve, wherein an actuating element for opening the valve can be arranged adjacent the air inlet opening of the individual air panel. The actuating element can be designed in such a way as to open the valve when the individual air panel is positioned on the air supply line.

According to an embodiment, each of the magnetic valves may comprise a leaf spring for prestressing the magnetic valve to a closed condition, i.e. to a position in which a closing element of the magnetic valve blocks any air flow out of the outlet opening.

According to an embodiment, each of the magnetic valves may comprise a closing element which is adapted to move substantially along a central axis of the outlet opening, between a closed position and an open position. To further improve a closing of an outlet opening, the air outlet may comprise a first contact surface and the magnetic valve may comprise a closing element with a second contact surface, wherein the first contact surface and the second contact surface are correspondingly inclined relative to a central axis of the air outlet opening. With such a structure, each closing element of the valve will easily find the air outlet opening so as to reliably close it.

So as to realize the specific movement of the closing element relative to the outlet opening, each of the magnetic valves according to an embodiment may comprise a supporting structure for the closing element in form of a parallelogram which allows a movement along the central axis of the outlet opening or, in other words, a movement perpendicular to the plane defined by the outlet opening.

According to an embodiment, the magnetic valve is actuatable by a magnetic force. It will be understood that the magnetic force may interact with an element of the magnetic valve, wherein this interaction may be a magnetic attraction or a magnetic repulsion. According to an embodiment, each of the magnetic valves may comprise a first magnetic element which is arranged so as to open the magnetic valve when being magnetically attracted by a second magnetic element arranged at the air inlet opening of the individual air panel. The magnetic actuating element can here be suitable for opening an air outlet if the air inlet opening is pushed over the air outlet.

According to an embodiment, each of the magnetic valves may comprise a fir tree connector as a means for mounting the magnetic valve at an air outlet opening.

In a further embodiment, the air supply system can further comprise an attachment rail, wherein the individual air panel can be secured to the attachment rail in such a way that it can be shifted along the air supply line.

In an embodiment, the individual air panel can be positioned on the air supply line at one of several predetermined positions spaced apart at uniform distances from each other along the air supply line, for example one inch. The positions may be predetermined in such a way that the air inlet opening always completely covers precisely one air outlet.

In a further embodiment, the individual air panel can also comprise a reading light, a stewardess call button, a loudspeaker, a USB interface for transmitting information and/or energy, an oxygen mask, an oxygen generator and/or an optical display element, so that the individual air panel comprises additional functionalities of a passenger supply unit (PSU).

In another embodiment, the air supply system can also comprise an air treatment unit that provides air with a desired humidity and temperature and/or filtered air, and routes it to the individual air panel through the air supply line.

In an embodiment, the aircraft comprises an air supply system as described herein for supplying passengers with individual inlet air. Let it here be noted that the air supply system can also be used in any means of passenger conveyance, for example in a bus, a railway car, or a ship.

The aspects described above along with other aspects, features and advantages of the invention can also be taken from the exemplary embodiments, which are described below with reference to the attached drawings.

BRIEF DESCRIPTION OF THE DRAWINGS

In the figures, identical reference numbers are used for the same or at least similar elements, components or aspects. Let it be noted that the embodiments to be described in detail below are only illustrative, and not limiting.

DETAILED DESCRIPTION

Figure 1:
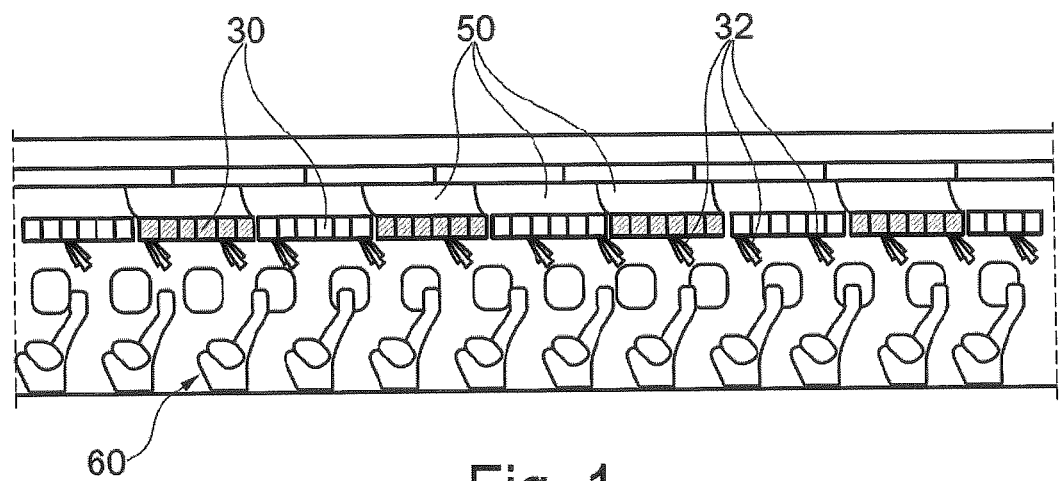
FIG. 1 is a longitudinal section through a passenger cabin.

FIG. 1 shows a longitudinal section through a passenger cabin of an aircraft. A plurality of seat rows 60 are arranged in the passenger cabin. Situated over the seat rows are hat racks or storage compartments 50 along with passenger supply units 30 to supply the passengers with signals, information, electrical or electronic connections, as well as fresh air. As depicted on FIG. 1, air nozzles 32 allocated to each individual seat row are provided, and situated on a passenger supply channel spaced a corresponding distance apart from each other.

Figure 2:
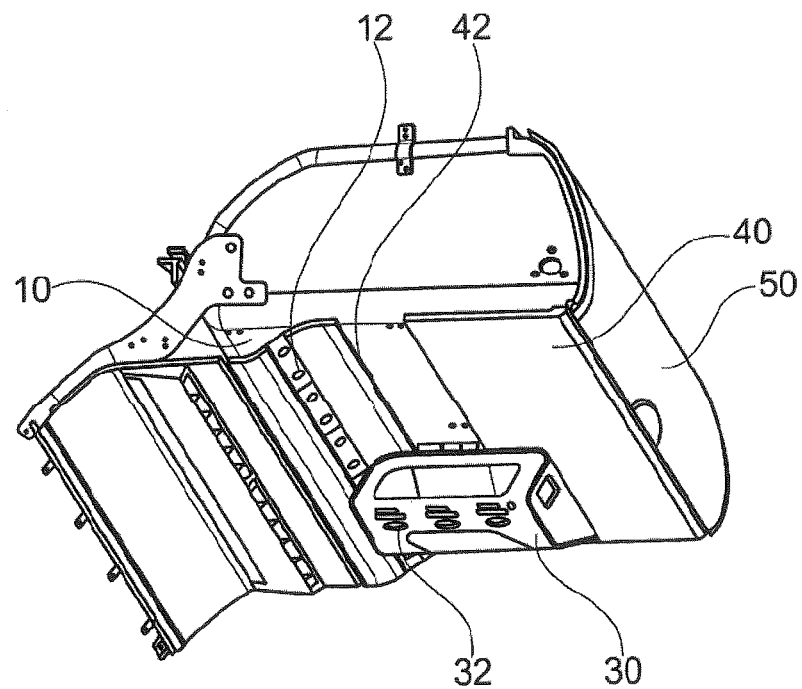
FIG. 2 is an isometric view of a passenger supply unit under a storage compartment.

FIG. 2 is an isometric view of a storage compartment 50, wherein cladding elements 40 are provided under the storage compartment. In roughly the middle under the storage compartment, the cladding elements 40 form a recess with a sliding rail 42 suitable for accommodating at least one passenger supply unit (PSU) 30. An air supply line 10 is located on one side of the recess. The air supply line 10 has at least one air outlet opening 12 closed by a valve which is set up to regulate a flow of air from the air supply line 10 into the PSU 30 and out of the nozzles 32. Corresponding meshing elements secured to the PSU 30 can engage into the rails 42.

Figure 3:
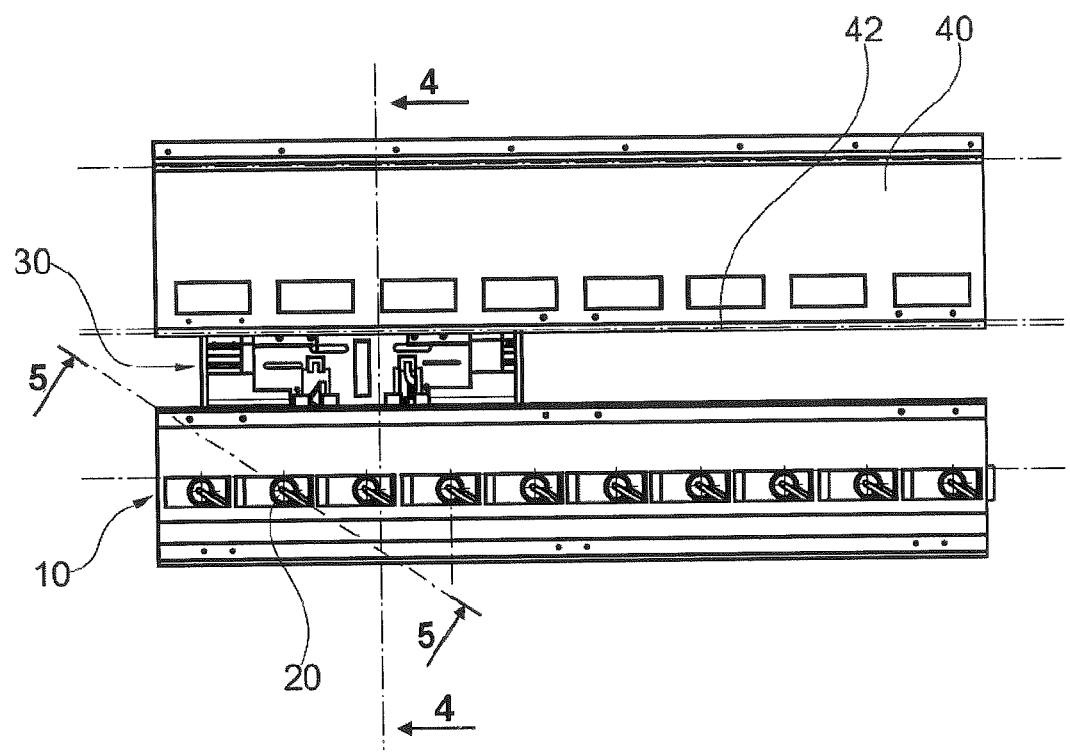
FIG. 3 is a top view onto an individual air panel and an air supply line with magnetic valves.

FIG. 3 is a view onto passenger supply unit 30 as can be seen from above through the recess between the claddings 40. Further shown in FIG. 3 is a row of valves 20 arranged within the air supply line 10 (partially section view).

Figure 4:
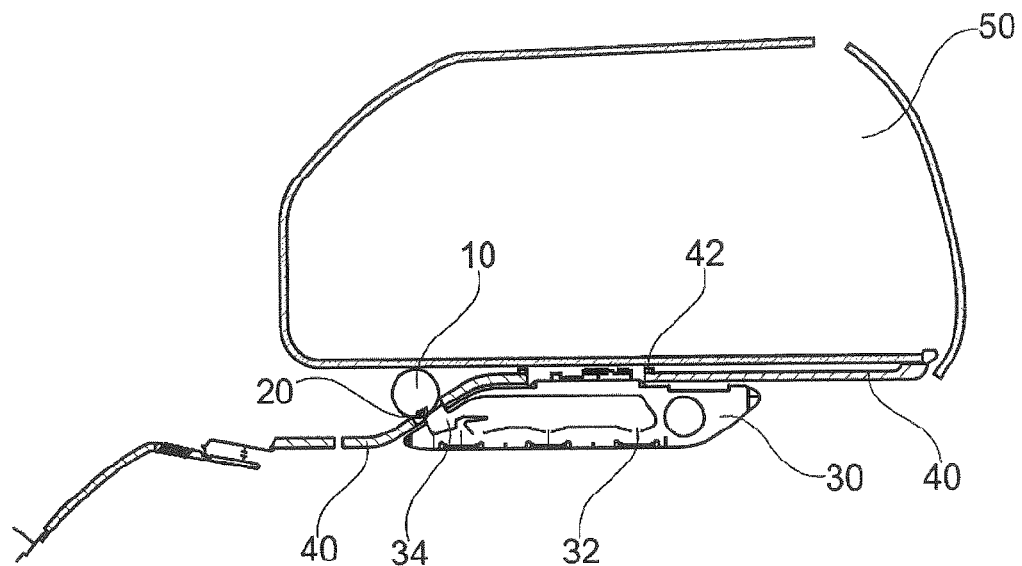
FIG. 4 is a section view along the line 4-4 in FIG. 3.

FIG. 4 is a section view along line 4-4 in FIG. 3, showing a passenger supply unit 30 beneath a storage compartment 50. The passenger supply unit 30 is slidingly attached to at least one rail 42 in a cladding 40. The passenger supply unit 30 comprises a at least one nozzle 32 and an air inlet opening 34, wherein air entering the passenger supply unit through the air inlet opening 34 is distributed within the passenger supply unit by a plenum to the opening of the nozzle 32.

Further shown in FIG. 4 is an air supply line 10 with a valve 20 which is adapted to close an air outlet opening of the air supply line.

Figure 5:
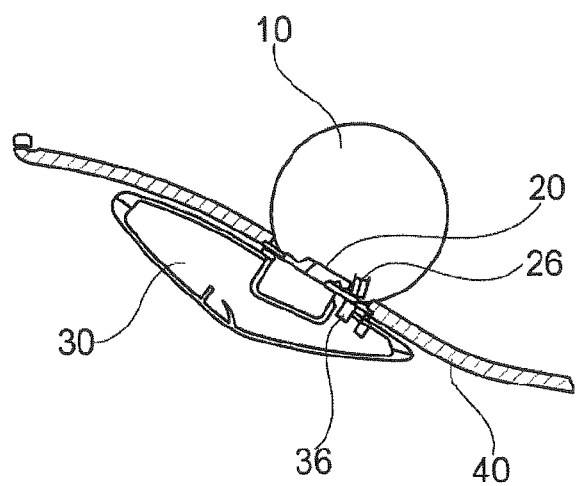
FIG. 5 is a section view along the line 5-5 in FIG. 3.

FIG. 5 is a section view along inclined line 5-5 in FIG. 3, showing a passenger supply unit 30 mounted on a cladding 40, together with an air supply line 10. Within the air supply line 10, a magnetic valve 20 is positioned, the magnetic valve 20 including a first magnetic element 26. On the other hand, the passenger supply unit 30 comprises a second magnetic element 36. As soon as the passenger supply unit 30 is arranged so that the inlet opening of the passenger supply unit is located at the air outlet opening of the air supply line 10, the first magnetic element 26 is located in direct vicinity of the second magnetic element 36.

The second magnetic element is 36 is arranged and adapted to magnetically attract the first magnetic element 26 so as to induce a tilting movement of the magnetic valve 20 and thus to open the valve.

Figure 6:
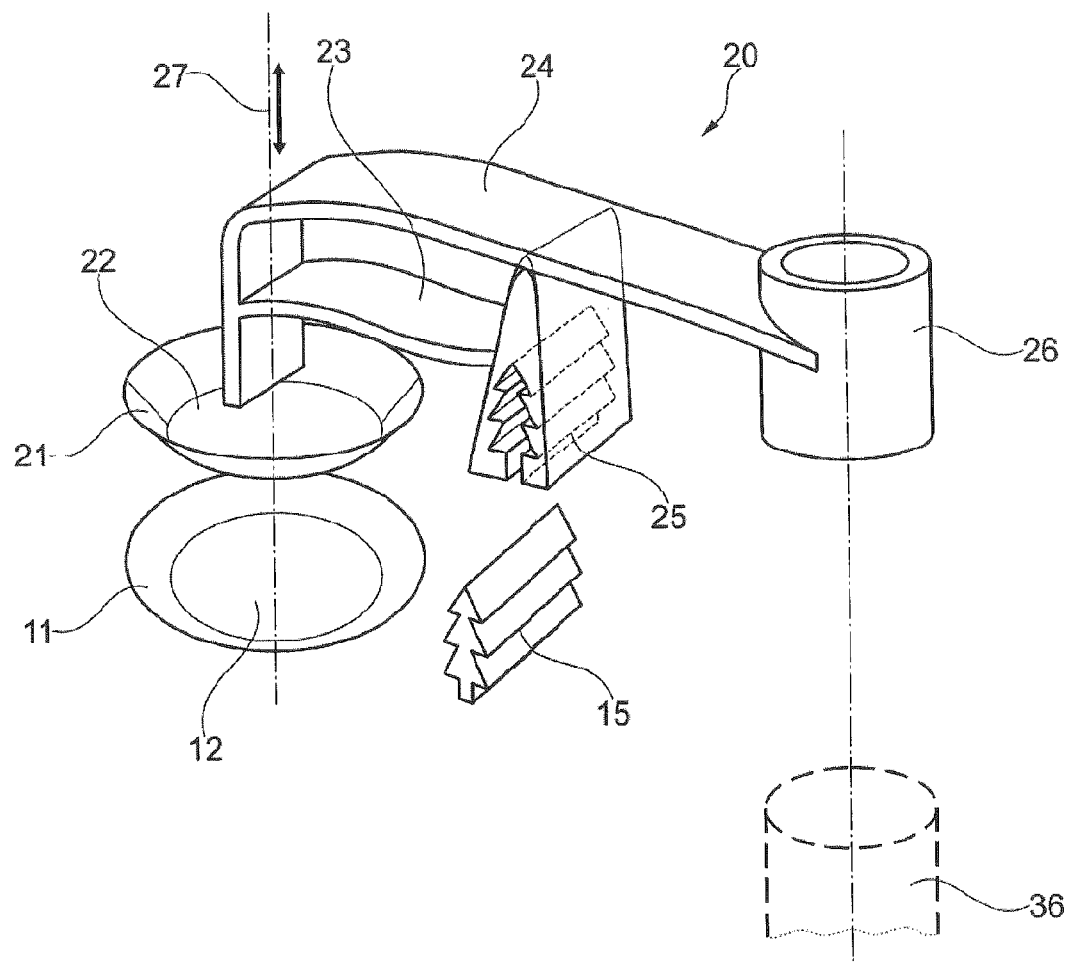
FIG. 6 is an isometric view of a magnetic valve.

The magnetic valve 20 is described in more detail with respect to FIG. 6. The magnetic valve 20 comprises a closing element 22 with a contact surface 21, a lever 24 which is supported by a support element 25, a leaf spring 23 and a first magnetic element 26.

The contact surface 21 of the closing element 22 may be formed as a part of a cone which fits to a correspondingly bevelled contact surface 11 provided at an air outlet opening 12. The combination of the two contact surfaces 11, 21 facilitates and ensures the closing of the air outlet opening 12 by means of the closing element 22. The air outlet opening 12 defines a central axis 27 and the structure of the magnetic valve 20 allows a movement of the closing element 22 in a direction of this central axis 27 (indicated by the double-arrow in FIG. 6).

The lever 24 extends away from the central axis 27 and the leaf spring 23 is arranged substantially in parallel to the level 24. Furthermore, the lever 24 is supported by the support element 25 and extends beyond that support element whereas the leaf spring 23 ends at the support element 25. The lever 24 together with the leaf spring 23 forms a parallelogram which transforms a tilting movement of the lever 24 into an axial movement of the closing element 22.

At the free end of the lever 24, the first magnetic element 26 is provided. As soon as a passenger supply unit is located beneath the air supply line so that an air inlet opening of the passenger supply unit is arranged facing the air outlet opening 12, a second magnetic element 36 of the passenger supply unit will be arranged with a common axis with the first magnetic element 26 so as to magnetically attract the same.

The support element 25 may have a recess in form of a fir tree allowing the magnetic valve 20 to be mounted within the air supply line onto a fir tree connector 15, as shown in FIG. 6. Such a shape of a connector allows the magnetic valve 20 to be mounted by merely putting the support element 25 onto the connector 15, without any further fixation step. It will be understood, that the support element 25 of the magnetic valve 20 may also be fixed within the air supply line by any other suitable means, for example by gluing.

Summarizing, the individual as supply may be ensured through a supply pipe that runs along the outside of the passenger supply channel of the mobile care unit under the luggage storage compartment. The supply pipe may have a plurality of openings, distributed over the entire length of the supply pipe. Each aperture may be sealed by a spring biased element inside a magnetic valve. Alternatively, each aperture may be sealed by a prestressed plastic contour inside the magnetic valve. This simplified prestressed plastic contour that may be provided with a magnetic valve, may be fixed over a fir tree connection, which may be located in the distributor pipe. The valve disc may always find the opening in the manifold pipe itself, by a generous cone valve plate. In the upper shell of the movable passenger supply unit integrated air collecting box, with an overlaying of more than the distance of two valves, air may be collected from the overlapped actuated magnetic valves into the passenger supply unit. The magnetic actuation may be done by the opposite magnetic elements on the passenger supply unit site. These magnetic elements may be fixed at uniform distances from each other, for example one inch, on the top of the upper shell of the movable passengers supply unit so that by moving of the passengers supply unit an inch, all the magnetic valves of the overlaid air outlets may be actuated and the air can be supplied to the passenger supply unit. The inch wise movement may be guaranteed by the sliding mechanism on the top of the passenger supply unit. The air collecting element on the passenger supply unit side may be using a plenum inside the passenger supply unit to transfer the air to the air outlets. The supplied air may be blown through the air outlets on the bottom surface of the passenger supply unit to a passenger.

While the invention was illustrated and described in detail in the drawings and above specification, it is intended that such illustrations and descriptions merely be illustrative or exemplary, and not restrictive, so that the invention is not limited by the disclosed embodiments. In the claims, the word "comprising" does not preclude other elements, and the indeterminate article "one" does not rule out a plurality.

Just the fact that certain features are mentioned in various dependent claims does not in itself limit the subject matter of the invention. Combinations of these features can also be advantageously used. The references in the claims are not to limit the scope of the claims.

REFERENCE LIST

10 Air supply line
11 bevelled contact surface
12 Air outlet opening
20 magnetic valve
21 contact surface
22 closing element
23 leaf spring
24 lever
25 support element
26 first magnetic element
27 central axis
30 passenger supply unit
32 Air nozzle
34 Air inlet opening
40 Cladding
42 Rail
50 Storage compartment
60 Seat row

The invention claimed is:
1. An air supply system for passengers, comprising:
   an air supply line with a plurality of laterally situated air outlets spaced apart at uniform distances from each other;
   a passenger supply unit with at least one air nozzle, an air inlet opening and a first magnetic element being laterally spaced apart from the inlet opening, wherein the passengers supply unit is configured to be variably positioned along the air supply line in such a way that the air inlet opening faces one of the air outlets; and
   a plurality of magnetic valves arranged in the air supply line and at the air outlets of the air supply line, wherein each of the magnetic valves comprises a closing element, a lever having a first end and a second end, a support element, and a second magnetic element, with the support element supporting the lever between the closing element arranged at the first end and the second magnetic element arranged at the second end,
   wherein one of the magnetic valves is magnetically actuated by the passenger supply unit when the air inlet opening of the passenger supply unit faces one air outlet of the supply line and when the first magnetic element of the passenger supply unit faces the second magnetic element of the magnetic valve, so that the second magnetic element of the magnetic valve is pulled towards the first magnetic element of the passenger supply unit, thus tilting the lever and moving the closing element away from the outlet of the supply line, so that air can flow out of the air supply line through the air outlet and the air inlet opening to the air nozzle.

2. The air supply system according to claim 1, wherein each of the magnetic valves comprises a leaf spring for prestressing the magnetic valve to a closed condition.

3. The air supply system according to claim 1, wherein the closing element is adapted to move substantially along a central axis between a closed position and an open position.

4. The air supply system according to claim 3, wherein each of the magnetic valves comprises a supporting structure for the closing element in form of a parallelogram.

5. The air supply system according claim 1, wherein each of the plurality of air outlets comprises a first contact surface and each of the magnetic valves comprises a closing element with a second contact surface, wherein the first contact surface and the second contact surface are correspondingly inclined relative to a central axis of the air outlet opening.

6. The air supply system of claim 1, wherein each of the magnetic valves comprises a fir tree connector so as to arrange the magnetic valve at one of the air outlets of the air supply line.

7. The air supply system according to claim 1, further comprising an attachment rail, wherein the passenger supply unit is secured to the attachment rail in such a way that the passenger supply unit can be shifted along the air supply line.

8. The air supply system according to claim 1, wherein the passenger supply unit can be positioned on the air supply line at one of several predetermined positions spaced apart at uniform distances from each other along the air supply line, and
   wherein the positions are predetermined in such a way that the air inlet opening covers one air outlet of the air supply line.

9. The air supply system according to claim 1, wherein the passenger supply unit further comprises at least one element from a group comprised of a reading lamp, stewardess call button, loudspeaker, USB interface, optical display element, oxygen mask and oxygen generator.

10. The air supply system according to claim 1, which further comprises an air treatment unit.

11. An aircraft with an air supply system for supplying passengers with individual inlet air, the air supply system comprising:

an air supply line with a plurality of laterally situated air outlets spaced apart at uniform distances from each other;

a passenger supply unit with at least one air nozzle, an air inlet opening and a first magnetic element, wherein the passengers supply unit is configured to be variably positioned along the air supply line in such a way that the air inlet opening faces one of the air outlets; and a plurality of magnetic valves arranged at the air outlets of the air supply line, wherein each magnetic valve comprises a second magnetic element, a closing element, a support element and a lever arranged between the second magnetic element and the closing element and supported by the support element allowing a tilting movement of the lever, the second magnetic element being arranged at a first end of the lever and the closing element arranged at a second end of the lever, wherein the second magnetic element of one of the magnetic valves is magnetically attracted by the first magnetic element of the passenger supply unit when the air inlet opening of the passenger supply unit faces an air outlet in the supply line, causing a tilting movement of the lever, and wherein the closing element of the magnetic valve is moved away from the passenger supply unit and out of the air outlet due to the tilting movement of the lever, so that air can flow out of the air supply line through the air outlet and the air inlet opening to the air nozzle.

* * * * *